United States Patent [19]

Miyazawa et al.

[11] Patent Number: 4,610,335
[45] Date of Patent: Sep. 9, 1986

[54] CONTROL DEVICE FOR CLUTCH AND TRANSMISSION IN VEHICLES

[75] Inventors: Takeshi Miyazawa; Hiroshi Sueshige; Yutaka Niikawa, all of Saitama; Masahide Shimokawa, Tokyo, all of Japan

[73] Assignee: Honda Giken Kogyo Kabushiki Kaisha, Tokyo, Japan

[21] Appl. No.: 550,302

[22] Filed: Nov. 9, 1983

[30] Foreign Application Priority Data

Nov. 10, 1982 [JP] Japan ................... 57-196944
Feb. 28, 1983 [JP] Japan ................... 58-32566

[51] Int. Cl.$^4$ ............................. B60K 41/22
[52] U.S. Cl. ..................... 192/3.62; 192/3.51; 192/3.54; 192/99 R; 192/109 D
[58] Field of Search .............. 192/3.51, 3.54, 3.61, 192/3.62, 52, 99 R, 109 D; 74/471 XY, 471 R, 96

[56] References Cited

U.S. PATENT DOCUMENTS

| 1,947,033 | 2/1934 | Bush | 192/3.62 |
| 1,986,214 | 1/1935 | McWade | 192/3.62 |
| 2,079,822 | 5/1937 | Serra | 192/3.62 |
| 3,003,604 | 10/1961 | Brueder | 192/3.62 |

FOREIGN PATENT DOCUMENTS

| 483122 | 4/1938 | United Kingdom | 192/109 D |
| 677753 | 8/1952 | United Kingdom | 192/3.54 |

Primary Examiner—George H. Krizmanich
Assistant Examiner—James J. Merek
Attorney, Agent, or Firm—Irving M. Weiner; Joseph P. Carrier; Pamela S. Burt

[57] ABSTRACT

A control device for a clutch and a transmission in a vehicle comprising a single control lever has a substantially single control lever angularly movable about at least one shaft for actuating the clutch and the transmission, a first link mechanism for transmitting angular movement of the control lever to the release lever of the clutch, a second link mechanism for transmitting angular movement of the control lever to the shifter of the transmission, and a damper for imposing a dampening force on the connection operation of the clutch. The damper has a damper stroke varying mechanism operatively cooperating with the second link mechanism for rendering the damper stroke of the damper shorter as higher-speed gears of the transmission are selected by the control lever.

9 Claims, 11 Drawing Figures

CONTROL DEVICE FOR CLUTCH AND TRANSMISSION IN VEHICLES

BACKGROUND OF THE INVENTION

1. Field of the Invention

The present invention relates to a control device for the clutch and transmission in the power transmission system of a vehicle, particularly, a driver-operated light working vehicle such as a lawn mower, a snowplow, or a truck.

2. Description of the Prior Art

It is preferable that driver-operated light working vehicles such as lawn mowers, snowplows, or trucks be drivable by almost anyone, with as foolproof driving operation as possible. In particular, the clutch and transmission should easily be operated while the vehicle is in operation. Vehicles capable of a variety of operations have a large number of selectable speed positions for a wide range of allowable vehicle speeds. Since the clutch has to be connected at different speeds in higher- and lower-speed positions, much skill has heretofore been required on the part of the driver in connecting the clutch.

The present invention effectively overcomes the above prior difficulties.

SUMMARY OF THE INVENTION

According to the present invention, there is provided a control device for a clutch and a transmission in a vehicle, comprising, a clutch including a release lever and disconnectable by the release lever, a transmission including a plurality of gears for changing the speed of the vehicle and a shifter for selecting one of the gears at a time for operation, a substantially single control lever angularly movable about at least one shaft for actuating the clutch and the transmission, a first link mechanism for transmitting angular movement of the control lever to the release lever of the clutch, a second link mechanism for transmitting angular movement of the control lever to the shifter of the transmission, and a damper for imposing a dampening force on the connection operation of the clutch. The damper has at one end thereof a damper stroke varying mechanism operatively cooperating with the second link mechanism for rendering the damper stroke of the damper shorter as higher-speed gears of the transmission are selected by the control lever.

It is an object of the present invention to provide a control device for the clutch and transmission in a vehicle, the control device having a single control lever actuatable for simultaneous transmission gear changing operation and clutch connecting and disconnecting operation, the clutch being connectable slowly for smooth vehicle starting and acceleration through simple operation.

Another object of the present invention is to provide a control device for the clutch and transmission in a vehicle, the control device having a control lever capable of selecting higher-speed transmission gear positions accompanied by faster and hence smoother clutch connection, and by simultaneous quick vehicle acceleration and transmission gear changing operation.

The above and other objects, features and advantages of the present invention will become more apparent from the following description when read in conjunction with the accompanying drawings in which preferred embodiments of the present invention are shown by way of example.

DETAILED DESCRIPTION OF THE PREFERRED EMBODIMENTS

Figure 1:
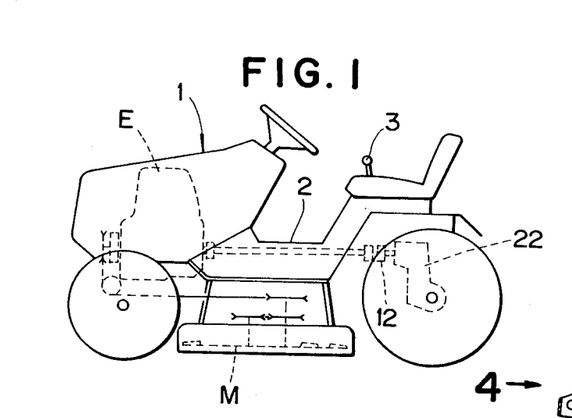
FIG. 1 is a side elevational view of a light working vehicle incorporating a control device according to the present invention.
Figure 2:
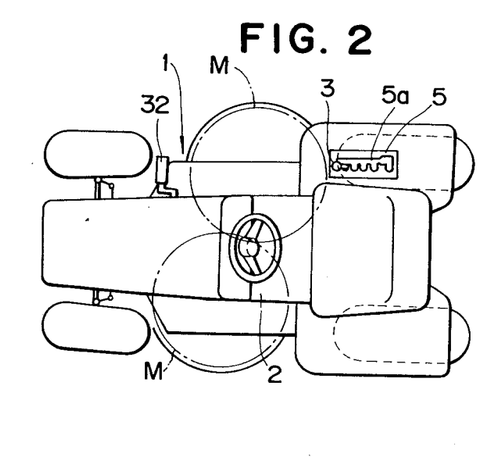
FIG. 2 is a plan view of the light working vehicle shown in FIG. 1.

As shown in FIGS. 1 and 2, a driver-operated working vehicle 1 has a vehicle body 2 supporting therebelow working devices M such as lawm mower cutting blades drivable by an engine E mounted on a front portion of the vehicle body 2, and a transmission 22 located on a rear portion of the vehicle body 2. The transmission 22 is operatively coupled to the engine E by a clutch 12 interposed therebetween. In FIG. 2, a brake pedal 32 is attached to a righthand side of the vehicle body 2, and a control lever 3 is disposed on a righthand side of a driver's seat in a position which is easily accessible by the driver when seated on the driver's seat. The control lever 3 is movable along a gear shift pattern 5a defined in a control panel 5 for actuating both the clutch 12 and the transmission 22.

Figure 3:
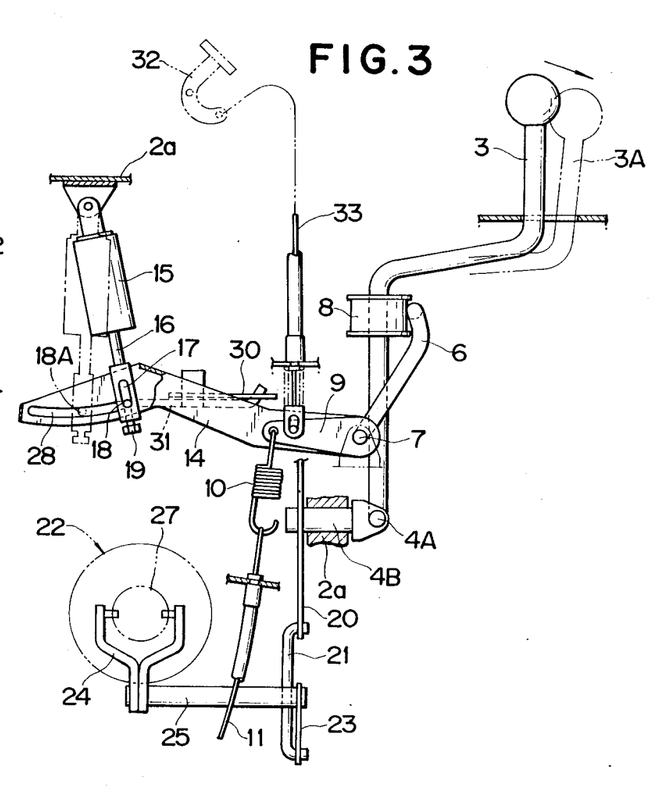
FIG. 3 is an elevational view of a control device according to a first embodiment of the invention, the control device being shown as seen from the rear portion of a vehicle body.
Figure 6:
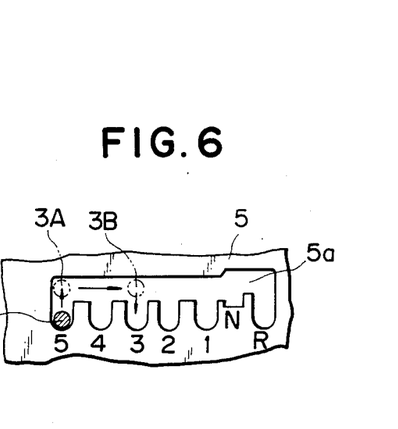
FIG. 6 is a view of a gear shift pattern on a control panel.

With reference to FIG. 3, the control lever 3 is mounted by two interconnected longitudinal and transverse shafts 4A, 4B on a vehicle frame 2a for back-and-forth and lateral angular movements with respect to the vehicle body. The control lever 3, when it is actuated, follows the gear shift pattern 5a which is substantially comb-shaped and elongated in the longitudinal direction of the vehicle body as shown in FIG. 6.

Figure 4:
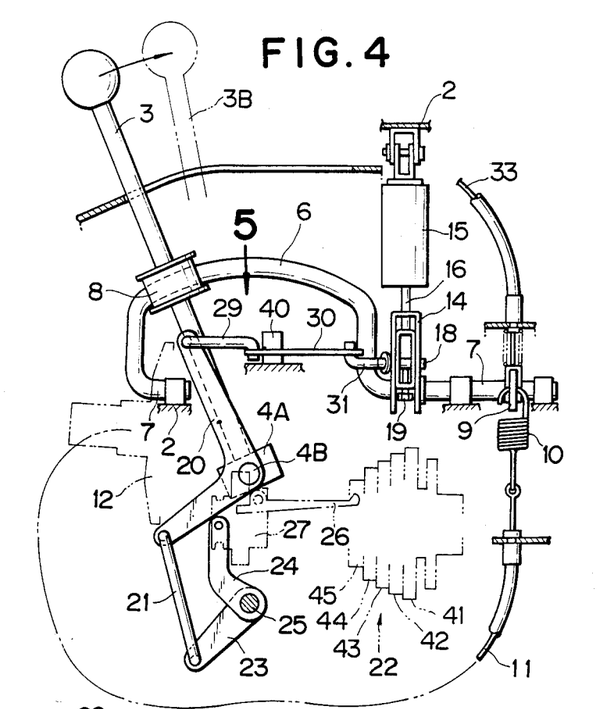
FIG. 4 is an elevational view of the control device taken in the direction of the arrow 4 in FIG. 3.

A clutch arm 6 is disposed alongside the control lever 3 and pivotably supported by a longitudinal shaft 7 on the vehicle frame 2, the clutch arm 6 being pivotally movable by the angular movement of the control lever 3 about the longitudinal shaft 4A. As illustrated in FIG. 4, the clutch arm 6 has an arcuate configuration such that it will be engaged by the control lever 3 no matter where the latter may be angularly positioned about the transverse shaft 4B. The control lever 3 has a bearing roller 8 held in engagement with the clutch arm 6 for preventing wear which would otherwise result from direct engagement between the control lever 3 and the clutch arm 6.

A clutch lever 9 is integrally coupled to the clutch arm 6 and angularly movable about the shaft 7. The clutch lever 9 is connected by connectors such as a tension coil spring 10 and a cable 11 to a release lever 13 (FIG. 5) of the clutch 12. The clutch arm 6, the clutch lever 9, the tension coil spring 10, and the cable 11 jointly constitute a first link mechanism for transmitting angular movement of the control lever 3 about the shaft 4A to the release lever 13 of the clutch 12.

A damper arm 14 is integrally attached to the clutch arm 6 in juxtaposed relation to the clutch lever 9. A one-way damper 15 which may comprise a hydraulic damper is coupled between a free end of the damper arm 14 and the upper vehicle frame 2, the one-way damper 15 imposing resistance or a dampening force when it is extended. The damper 15 has a piston rod 16 connected to the damper arm 14 by a pin 18 extending through oblong holes 17 defined in the piston rod 16. The pin 18 is positionally adjustable in the oblong holes 17 by an adjustment screw 19.

As shown in FIG. 4, a change arm 20 in the form of a bell crank in integrally attached to the transverse shaft 4B and operatively connected by a rod 21 to a shift lever 23 of the transmission 22, the shift lever 23 being integrally mounted on a shaft 25. The transmission 22 also includes a shifter 24 integrally mounted on the shaft 25 and engaging a key holder 27 supporting a transmission gear selection key 26 for selecting one of a plurality of transmission gears 41, 42, 43, 44, 45 at a time. The change arm 20, the rod 21, and the shift lever 23 jointly constitute a second link mechanism for transmitting angular movement of the control lever 3 about the transverse shaft 4B.

In FIG. 4, the control lever 3 is angularly located in a fifth-speed, or highest-speed gear position with the key 26 engaging a highest-speed transmission gear, and the clutch 12 is connected.

To lower the vehicle speed, the control lever 3 is laterally displaced to a position as shown by the dot-and-dash line 3A in FIG. 3, and then longitudinally moved along the longitudinal slot of the gear shift pattern 5a as shown in FIG. 6 to a desired gear position as indicated by the dot-and-dash line 3B in FIG. 4.

When the control lever 3 is first shifted to the position 3A in FIG. 3, the clutch arm 6 and the clutch lever 9 are pivotally moved by the control lever 3 to enable the spring 10 and the cable 11 to angularly move the release lever 13 about a shaft 35, thereby disconnecting the clutch 12. At this time, the damper arm 14 is also turned with the clutch lever 9 to compress the damper 15, which then imposes no dampening force and hence no resistance to the disconnection of the clutch 12.

When the control lever 3 is then moved back to the position 3B in FIG. 4 while the clutch 12 is being disconnected with no driving power transmitted to the driven wheels, the shifter 24 is actuated by the change arm 20, the rod 21, and the shift lever 23 to move the key holder 27 backward for bringing the key 27 into engagement with a lower-speed transmission gear.

Upon release of the control lever 3, it is automatically returned to an upright position under the resilient forces of a clutch spring 36 and a release lever return spring 37 (FIG. 5) and enters a lateral slot of the gear shift pattern 5a aligned with the selected gear position. At the same time, the clutch 12 is connected as the damper 14 returns to its original position. Since the damper 14 exerts a dampening force while it is extended, the clutch 12 is a slowly connected.

The pin 18 by which the damper 15 is connected to the damper arm 14 is inserted in oblong holes 28 in the damper arm 14 for allowing the pin 18 to change its position in the longitudinal direction of the damper arm 14. The pin 18 has one end connected to an end of the change arm 20 by a rod 29, a bell crank 30, and a rod 31, as shown in FIG. 4, the bell crank 30 being pivotally movable about a shaft 40.

As the control lever 3 is moved back and forth, the pin 18 is moved longitudinally along the arm 14 by the change arm 20, the rod 29, the bell crank 30 and the rod 31, that is, the distance between the longitudinal shaft 7 and the pin 18 varies. In the fifth-speed gear position, the pin 18 is closest to the longitudinal shaft 7 as shown in FIG. 3. When a lower-speed transmission gear is selected, the pin 18 is moved away from the shaft 7 into a position as indicated by the dot-and-dash line 18A in FIG. 3. Therefore, the higher the transmission gear position is, the shorter the dampening stroke of the damper 15 becomes. This enables the clutch 12 to be connected more quickly in higher-speed gear positions than in lower-speed gear positions, though the lever 3 returns relatively slowly, that is, the clutch 12 is connected relatively slowly as described above after a desired transmission gear has been selected.

Figure 5:
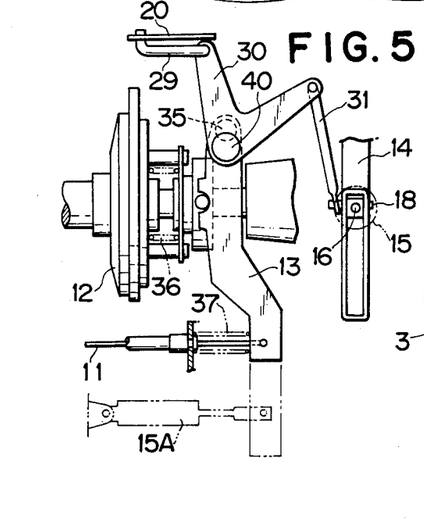
FIG. 5 is a plan view of the control device as related to a clutch, taken in the direction of the arrow 5 in FIG. 4.

While in the foregoing embodiment the damper arm 14 is separately provided and the damper 15 is connected thereto, a damper 15A may alternatively be directly connected to the clutch release lever 13 as illustrated by the dot-and-dash line in FIG. 5.

With a brake pedal 32 connected by a cable 33 to the clutch lever 9 as shown in FIG. 3, the clutch 12 can also be disconnected at the same time that the brake pedal 32 is depressed.

FIGS. 7 through 10 illustrate a control device according to a second embodiment of the present invention. In the first embodiment as described above, the control lever 3 is angularly movable in different planes about the two interconnected shafts 4A, 4B for effecting clutch connection and disconnection and transmission gear shifting operation. According to the second embodiment, a control lever is angularly movable about only one shaft for simultaneous clutch and tranmission operations with greater ease.

Figure 7:
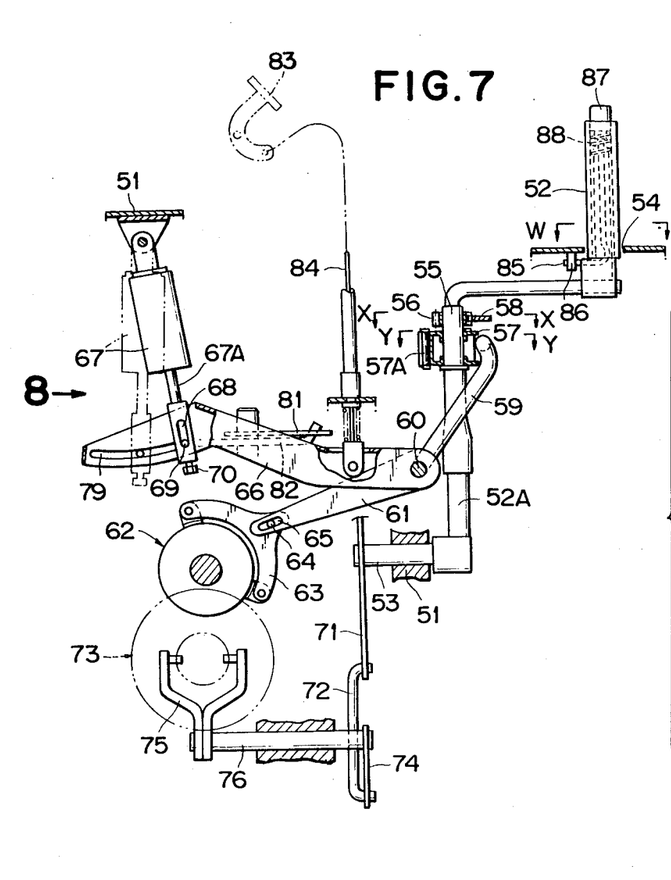
FIG. 7 is a view similar to FIG. 3, showing a control device according to a second embodiment of the present invention.

As shown in FIG. 7, a control lever 52 for actuating a clutch and a transmission is mounted by a shaft 53 on a vehicle frame 51 for back-and forth angular movement along a straight gear shift pattern 54a defined in a control panel 54 (FIG. 10) and extending longitudinally of the vehicle body. The control lever 52 has a proximal end portion 52A comprising a strong leaf spring which will flex back and forth.

Figures 8, 9, 11:
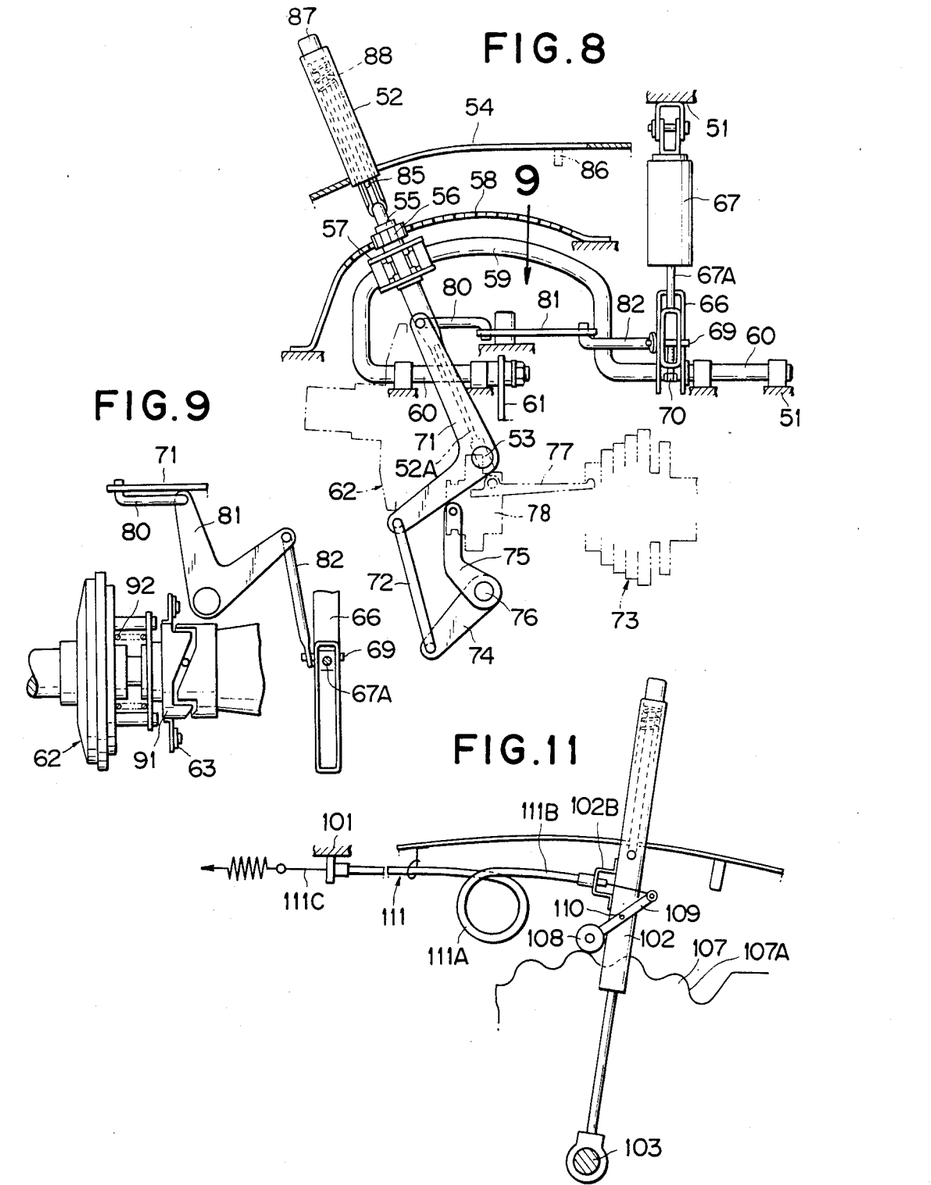
FIG. 8 is an elevational view of the control device taken in the direction of the arrow 8 in FIG. 7.
FIG. 9 is a plan vie of the control device as related to a clutch, the view being taken in the direction of the arrow 9 in FIG. 8.
FIG. 11 is a view similar to FIG. 8, illustrating a modification of a clutch control mechanism according to the second embodiment.

The control lever 52 has a short tube 55 loosely fitted over its intermediate portion. A pinion 56 and a triangular cam 57 (FIG. 10) are integrally attached to the short tube 55, the pinion 56 being held at all times in meshing engagement with a rack 58 disposed alongside thereof and extending longitudinally of the vehicle body. A clutch arm 59 is supported by a longitudinal shaft 60 on the vehicle frame 51 alongside of the triangular cam 57, and is held at all times in contact with the triangular cam 57. Thus, the clutch arm 59 is caused to swing in response to rotation of the triangular cam 57. As shown in FIG. 8, the clutch arm 59 is arcuate in shape such that it will remain in contact with the triangular cam 57 no matter where the control lever 52 may be angularly positioned about the shaft 53. The triangular cam 57 has bearing rollers 57A positioned at corners thereof and rollingly engageable with the clutch arm 59 to prevent wear which would otherwise be caused by direct engagement between the triangular cam 57 and the clutch arm 59. The pinion 56 and the triangular cam 57 are angularly moved through 120 degrees when the control lever 52 is angularly shifted one gear position.

A clutch lever 61 is integrally mounted on the clutch arm 59 and angularly movable about the shaft 60. The clutch lever 61 has a free end coupled to a control end of a release lever 63 of a clutch 62 by a pin 64 extending through an oblong hole 65 defined in the clutch lever 61. Angular movement of the control lever 52 is thus transmitted to the release lever 63 through the triangular cam 57, the clutch arm 59, and the clutch lever 61.

A damper arm 66 is integrally attached to the clutch arm 59 in juxtaposed relation to the clutch lever 61 for angular movement about the shaft 60. A damper 67 is operatively connected to the damper arm 66 through a pin 69 with an adjustment screw 70, oblong holes 68, and oblong holes 79. The damper 67 is of the same construction and operation as the damper 15 according to the first embodiment.

A link mechanism for transmitting angular movement of the control lever 52 to a transmission 73 is of the same construction as that of the link mechanism according to the first embodiment. The link mechanism comprises a change arm 71 in the form of a bell crank integrally connected with the shaft 53, a rod 72, and a shift lever 74 coupled to a shifter 75 of the transmission 73. The shifter 75 is held in engagement with a key holder 78 supporting a transmission gear selection key 77.

The control lever 52 has a control knob 87 projecting beyond an upper end thereof for preventing the transmission from being continuously shifted from a forward-gear position to a reverse-gear position.

Figure 10:
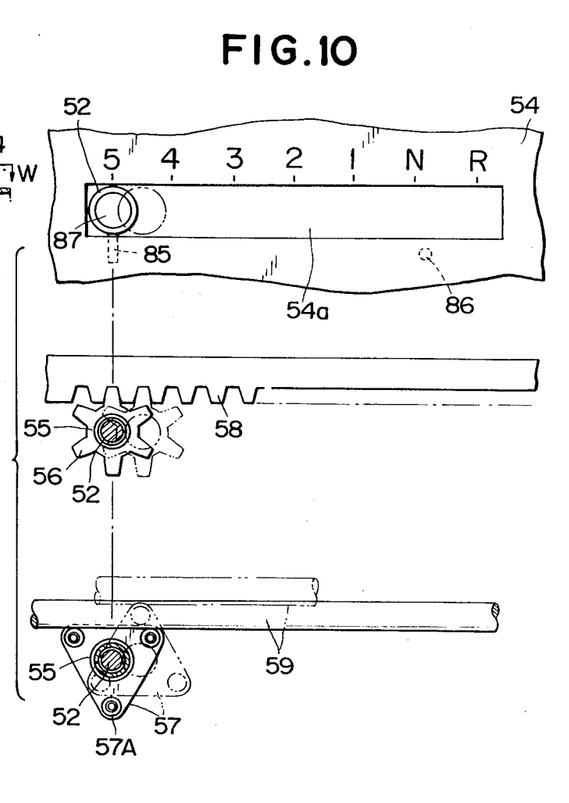
FIG. 10 is a set of cross-sectional views aligned together taken along lines W—W, X—X, and Y—Y, respectively, of FIG. 7.

In FIGS. 8 and 10, the control lever 52 is disposed in a fifth-speed gear position, that is, a highest-speed gear position with the clutch arm 59 contacting one side of the triangular cam 57, that is, a non-lifting portion thereof. In this position, the clutch 62 is connected and the key 77 of the transmission 73 is held in engagement with a highest-speed transmission gear.

To reduce the vehicle speed, the control lever 52 is moved to the right (FIGS. 8 and 10) along the gear shift pattern 54a in the control panel 54. The pinion 56 and the triangular cam 57 now start being turned to cause one of the corner rollers 57A, or a lifting portion, of the triangular cam 57 to push the clutch arm 59 and the clutch lever 61 angularly until the release lever 63 is rotated circumferentially around the clutch 62. A clutch release drum cam 91 is then moved axially against the force of a clutch spring 92 while rotating about its own axis to thereby disconnect the clutch 62.

At this time, the damper arm 66 is also angularly moved with the clutch lever 61 to compress the damper 67, which, however, presents no resistance to the disconnection of the clutch 62.

The angular movement of the control lever 52 also causes the change arm 71 to turn about the shaft 53 at the same time or with a slight delay due to flexing of the proximal end portion 52A of the lever 52. the change arm 71, as it is angularly moved, enables the rod 72 and the shift lever 74 to actuate the shifter 75 for moving the key holder 78 backward to bring the key 77 into engagement with a next lower transmission gear.

The triangular cam 57 continues to turn until the control lever 52 reaches a fourth-speed position, whereupon the corner roller 57A is released from the clutch arm 59. The clutch arm 59 and the clutch lever 61 are now allowed to return to their original position under the resiliency of the clutch spring 92 and a return spring (not shown), thereby connecting the clutch 62. The clutch 62 is connected slowly at this time because the damper 67 is extended to exert a dampening force on the returning movement of the clutch lever 61.

The pin 69 by which the damper 67 is coupled to the damper cam 66 is operatively connected to the change arm 71 by a rod 80, a bell crank 81, and a rod 82. As with the first embodiment, this arrangement enables the dampening stroke of the damper 67 to become shorter as the control lever 52 is shifted into higher-speed gear positions.

To prevent the control lever 52 from being shifted continuously from a forward-gear position to a reverse-gear position or vice versa, the control lever 52 has a pin 85 connected to the knob 87, there being a projection 86 mounted on the vehicle frame for engagement with the pin 85. The pin 85 can be disengaged from the projection 86 when the knob 87 is depressed against the resilient force of a spring 88 disposed in the control lever 52.

FIG. 11 illustrates a modification of the clutch control mechanism according to the second embodiment. The illustrated modification can replace the triangular cam 57, the clutch arm 59, and the clutch lever 61.

More specifically, a plate cam 107 is fixedly mounted in position and has an undulating profile 107a defined on an edge extending substantially parallel to the path of angular movement of a control lever 102. The undulating profile 107a has successive recesses corresponding respectively to transmission gear positions such as a first-speed gear position, a second-speed gear position, and the like which are selected by the control lever 102. A swingable arm 109 is attached by a pivot pin 110 to the control lever 102 at its substantially intermediate position. The swingable arm 109 has one end supporting a roller 108 held at all times in contact with the undulating profile 107a of the cam 107.

The other end on the swingable arm 109 is connected by a Bowden wire 111 to a clutch actuator (not shown) which corresponds to the release lever 63 of the second embodiment. The Bowden wire 111 has a slackening loop 111A for taking up a change in the length of the Bowden wire 111 due to angular movement of the control lever 102. The Bowden wire 111 is composed of an outer sheath or tube 111B having one end fixed to a vehicle frame 101 and an opposite end fixed to a bracket 102B fastened to the control lever 102, and an inner wire 111C enclosed in the outer sheath 111B.

When the control lever 102 is angularly moved about a shaft 103 from one gear position to a next gear position, the roller 108 on the arm 109 moves past one cam lobe of the cam 107. In response to swinging movement of the arm 109 caused when the roller 108 clears the cam lobe, the inner wire 111C is moved axially back and forth to disconnect and connect the clutch. A damper (not shown) which is actuatable when the clutch is connected may be connected between the control lever 102 and the swingable arm 109, or disposed somewhere in the inner wire 111C.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed is:

1. A control device for a clutch and a transmission in a vehicle, comprising;
   (a) a clutch including a release lever and a clutch spring, and disconnectable by said release lever;
   (b) a transmission including a plurality of gears for changing the speed of said vehicle and a shifter for selecting one of said gears at a time for operation;
   (c) a substantially single control lever angularly moveable about at least one shaft for actuating said clutch and said transmission;
   (d) a first link mechanism for transmitting angular movement of said control lever to said release lever of said clutch;
   (e) a second link mechanism for transmitting angular movement of said control lever to said shifter of said transmission;
   (f) a damper for imposing a dampening force during engagement of said clutch. said damper is a hydraulic damper connected to said second link mechanism.

2. A control device according to claim 1, wherein said damper has at one end thereof a damper stroke varying mechanism operatively cooperating with said second link mechanism for rendering the damper stroke of said damper shorter as higher-speed gears of said transmission are selected by said control lever.

3. A control device according to claim 1, wherein said control lever has two shafts about which said control lever is angularly movable in first and second directions perpendicular to each other, said first link mechanism being actuatable in response to the angular movement of said control lever in said first direction, and said second link mechanism being actuatable in response to the angular movement of said control lever in said second direction.

4. A control device according to claim 3, wherein said first link mechanism includes a clutch arm pivotally movable in response to the angular movement of said control lever in said first direction, said clutch arm is of an arcuate configuration and is operatively connected to said release lever of said clutch.

5. A control device according to claim 1, wherein said first and second link mechanisms are actuatable in response to angular movement of said control lever in one direction.

6. A control device according to claim 1, wherein said damper is in the form of a one-way damper, one end of which being swingably mounted to a vehicle body, and said damper stroke varying means includes a damper arm connected to said first link mechanism and having a longitudinally extending elongated bore, and a third link mechanism connected to said second link mechanism, the swingable end of said damper being free to move within and along the elongated bore via said third link mechanism in accordance with the selection of a particular gear.

7. A control device according to claim 1, wherein said control lever is swingable in one direction and a cam member is rotatably mounted on said shaft of the control lever, said release lever being moved by either one of said swingable control lever and said rotary cam member while said shifter being moved by the other.

8. A control device according to claim 7, wherein said cam member is in the form of a triangular cam.

9. A control device according to claim 1, wherein said first link mechanism includes a swingable arm swingably movable in response to movement of said control lever, one end of said swingable arm rollably engages a plate cam, and an opposite end of said swingable arm is connected by a Bowden wire to said release lever.

* * * * *

UNITED STATES PATENT AND TRADEMARK OFFICE
CERTIFICATE OF CORRECTION

PATENT NO. : 4,610,335

DATED : September 9, 1986

INVENTOR(S) : Takeshi Miyazawa et al

It is certified that error appears in the above-identified patent and that said Letters Patent is hereby corrected as shown below:

```
Column 2, line 26, "vie" should read -- view --.
Column 3, line 26, "in" should read -- is --.
Column 6, line 14, "cam" should read -- arm --.
Column 4, line 65, delete "of".
```

Signed and Sealed this

Seventeenth Day of February, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,610,335
DATED : September 9, 1986
INVENTOR(S) : Takeshi MIYAZAWA et al It is certified that error appears in the above-identified patent and that said Letters Patent are hereby corrected as shown below:

Column 4, line 5 delete "a".

Column 6, line 4 before "position" insert --gear--.

Column 6, line 47 change "on" to --of--.

Claim 1, (column 7, line 29), change the period to a comma.

Signed and Sealed this

Twenty-first Day of April, 1987

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,610,335

DATED : September 9, 1986

INVENTOR(S) : Takeshi MIYAZAWA

It is certified that error appears in the above-identified patent and that said Letters Patent is hereby corrected as shown below:

Column 8, line 15 (Claim 6, line 1), change "1" to --2--.

Signed and Sealed this

Twenty-first Day of August, 1990

*Attest:*

HARRY F. MANBECK, JR.

*Attesting Officer*      *Commissioner of Patents and Trademarks*